United States Patent [19]
Stahl et al.

[11] Patent Number: 5,588,829
[45] Date of Patent: Dec. 31, 1996

[54] THRUST GRATING COOLER AND METHOD FOR COOLING HOT MATERIAL

[75] Inventors: Hans-Juergen Stahl, Cologne; Guenter Dittmann, Dessau; Reimer Doege, Zerbst; Richard Schneider, Wermelskirchen; Ralf Filges, Bergisch Gladbach 1, all of Germany

[73] Assignee: Kloeckner-Humboldt-Deutz AG, Cologne, Germany

[21] Appl. No.: 273,147

[22] Filed: May 19, 1994

Related U.S. Application Data

[63] Continuation of Ser. No. 11,180, Jan. 29, 1993, abandoned.

[30] Foreign Application Priority Data

Jan. 31, 1992 [DE] Germany ............................ 42 02 777.2
Dec. 16, 1992 [DE] Germany ............................ 42 42 374.0

[51] Int. Cl.⁶ ............................ F27D 15/02; F23K 3/08; F23H 3/02
[52] U.S. Cl. ............................ 432/77; 110/291; 110/298; 110/282
[58] Field of Search ............................ 432/77; 110/278, 110/281, 282, 283, 284, 291, 298, 299, 300

[56] References Cited

U.S. PATENT DOCUMENTS

| | | | |
|---|---|---|---|
| 4,170,183 | 10/1979 | Cross | 110/291 |
| 4,510,873 | 4/1985 | Shigaki | 110/282 |
| 4,563,959 | 1/1986 | Fujiwara | 110/291 |
| 4,870,913 | 10/1989 | Schneider | 110/291 |
| 4,876,972 | 10/1989 | Mrklas | 110/298 |
| 4,884,516 | 12/1989 | Linsen | 110/291 |
| 5,149,266 | 9/1992 | Heinemann et al. | 432/77 |

*Primary Examiner*—Willis R. Wolfe
*Attorney, Agent, or Firm*—Hill, Steadman & Simpson

[57] ABSTRACT

In order to create a thrust grating cooler whose system for delivering the cooling air to the individually aerated, reciprocally movable grating plate carriers manages without flexible cooling air hose conduits that are susceptible to wear, at least one cooling air channel is provided that moves together with the C-push frame which carries the movable grating plate carriers. The cooling air channel is mounted at the underside of the C-push frame either transversely or parallel with respect to the longitudinal axis of the cooler. The air entry end of the cooling air channel that is co-moved together with the C-push frame is connected to a stationary cooling air delivery nozzle by means of a seal. A plurality of rigid connecting channels branch off from the cooling air channel to the movable grating plate carriers and supply both the carriers and the movable perforated grating plates that are secured thereon with cooling air. In an embodiment, the C-push frame itself is the cooling air channel and is connected directly to the movable grating plate carriers.

20 Claims, 5 Drawing Sheets

THRUST GRATING COOLER AND METHOD FOR COOLING HOT MATERIAL

This is a continuation of application Ser. No. 08/011,180, filed Jan. 29, 1993, now abandoned.

BACKGROUND OF THE INVENTION

The invention is directed to a thrust grating cooler for cooling hot material, for example cement clinker emerging from a rotary tubular kiln.

In a thrust grating cooler, the grate system is composed of a plurality of stationary and movable grating plate carriers. A plurality of grating plates are secured to the carriers and are provided with openings for cooling air and traversed by cooling air essentially from bottom to top. As viewed in a conveying direction, rows of stationary grating plates are secured by means of their stationary grate plate carriers to the lower part of the cooler housing or to the sidewalls of the cooler housing. These stationary rows alternate with reciprocally movable rows of grating plates that are secured in common by their correspondingly reciprocally movable grate plate carriers to one or more C-shaped push frames. The C-push frames are mounted so as to be longitudinally movable. The drive of the C-push frames is provided by drives installed outside the lower part of the housing, for example by slider-crank mechanisms or hydraulic cylinders. As a result of the common, oscillatory motion of all of the movable rows of grating plates, the material to be cooled is conveyed in batches over the rows of grating plates having air flowing upwardly therethrough and is thereby cooled.

When the grate plate carriers are formed as hollow beams arranged transversely relative to the longitudinal axis of the cooler and through which the cooling air is brought to the individual grating plates, difficulties arise in having the cooling air flow into the reciprocally movable grating plate carriers. Up to now, the reciprocally movable grating plate carriers were individually aerated with cooling air flowing through flexible hose conduits extending from stationary cooling air conduits positioned under the thrust gratings. The thrusting motion of the grating plate carriers caused a constant pendulating motion of the flexible air hose conduits that resulted in premature rupturing due to the frequent alternating bending stresses and due to the simultaneous wear as a result of the fine cooling air dust adhering thereto. This rupturing of the cooling hoses is a serious problem which can cause shutdowns of the clinker cooler as well as shutdowns of an entire cement clinker production line.

SUMMARY OF THE INVENTION

It is therefore an object of the present invention to provide a reliably functioning thrust grating cooler whose system for supplying the cooling air to the individually aerated, reciprocally moving grating plate carriers is accomplished without flexible cooling air hose conduits.

The present invention finds particular utility in a thrust grating cooler in which there are a plurality of stationary grating plate carriers formed of hollow beams for receiving cooling air, a plurality of reciprocally movable grating plate carriers formed of hollow beams for receiving cooling air, the movable grating plate carriers being secured on at least one push frame that is longitudinally reciprocally movable. At least one cooling air channel is arranged so as to move together with the push frame. A plurality of rigid connecting channels each communicating at one end with the cooling air channel and at a opposite end to a different one of said movable grating plate carriers. An air entry end of the cooling air channel is connected to a stationary cooling air delivery nozzle by means of a seal.

That is, the air entry end of the cooling air channel is reliably and dependably sealed with respect to the stationary cooling air delivery nozzle despite the mobility of the reciprocatingly moving cooling air channel. This preferably is assisted by orienting the axis of the air entry end of the co-moved cooling air channel parallel to the direction of the reciprocal motion of the C-push frame. The plurality of rigid connecting channels branch off from the co-moving cooling air channel and proceed to the grating plate carriers that are correspondingly reciprocally movable and are formed as hollow beams. These connecting channels supply the hollow beam grating plate carriers as well as the cooling grates secured thereto with cooling air, without the need for cooling air hose conduits.

The invention and the further features and advantages thereof shall be set forth in greater detail with reference to the exemplary embodiments schematically shown in the figures.

DETAILED DESCRIPTION OF THE PREFERRED EMBODIMENTS

Figure 1:
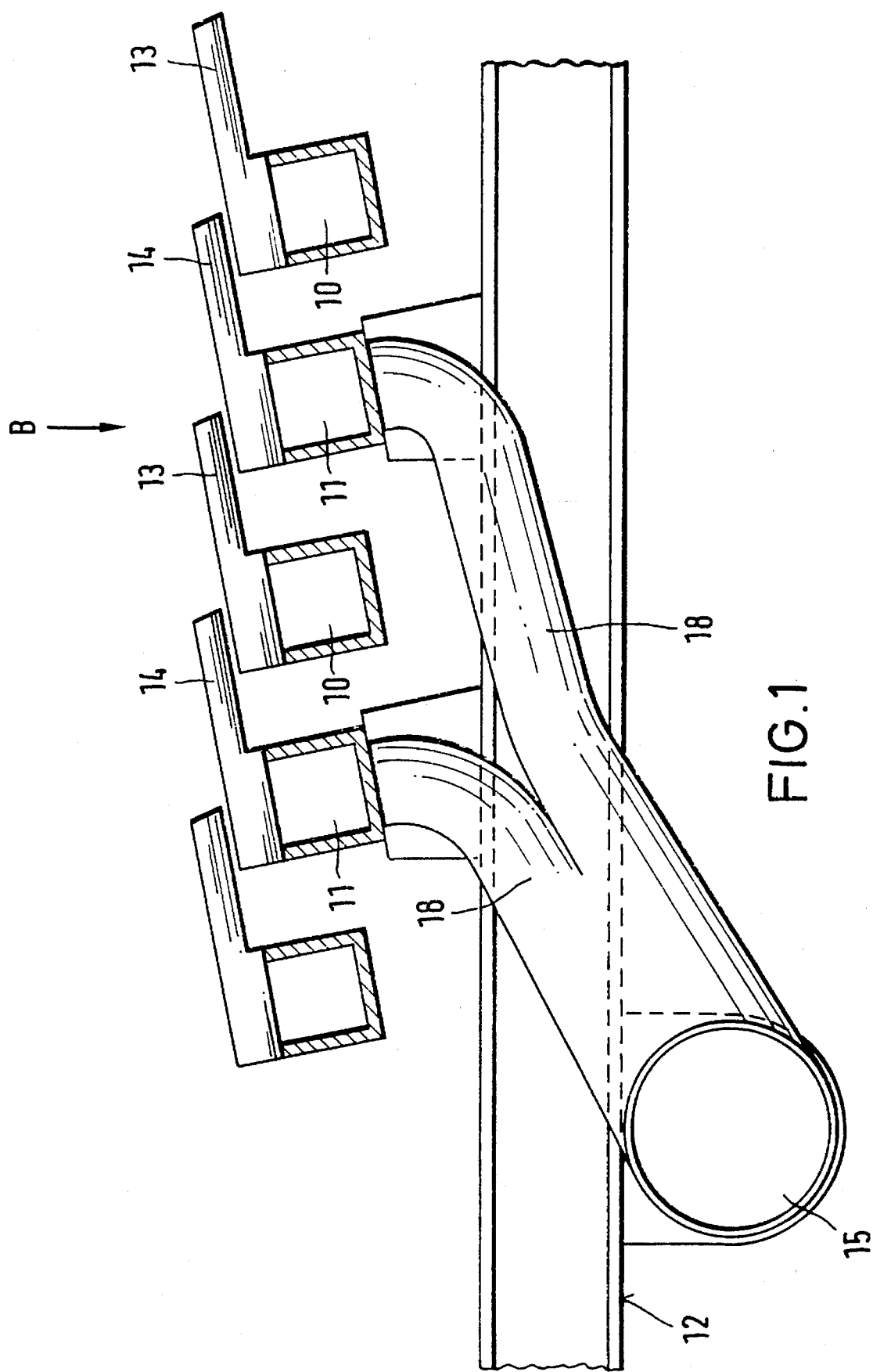
FIG. 1 is a vertical longitudinal sectional view through a first embodiment of the thrust grating cooler of the invention generally along the line A—A of FIG. 2.
Figure 2:
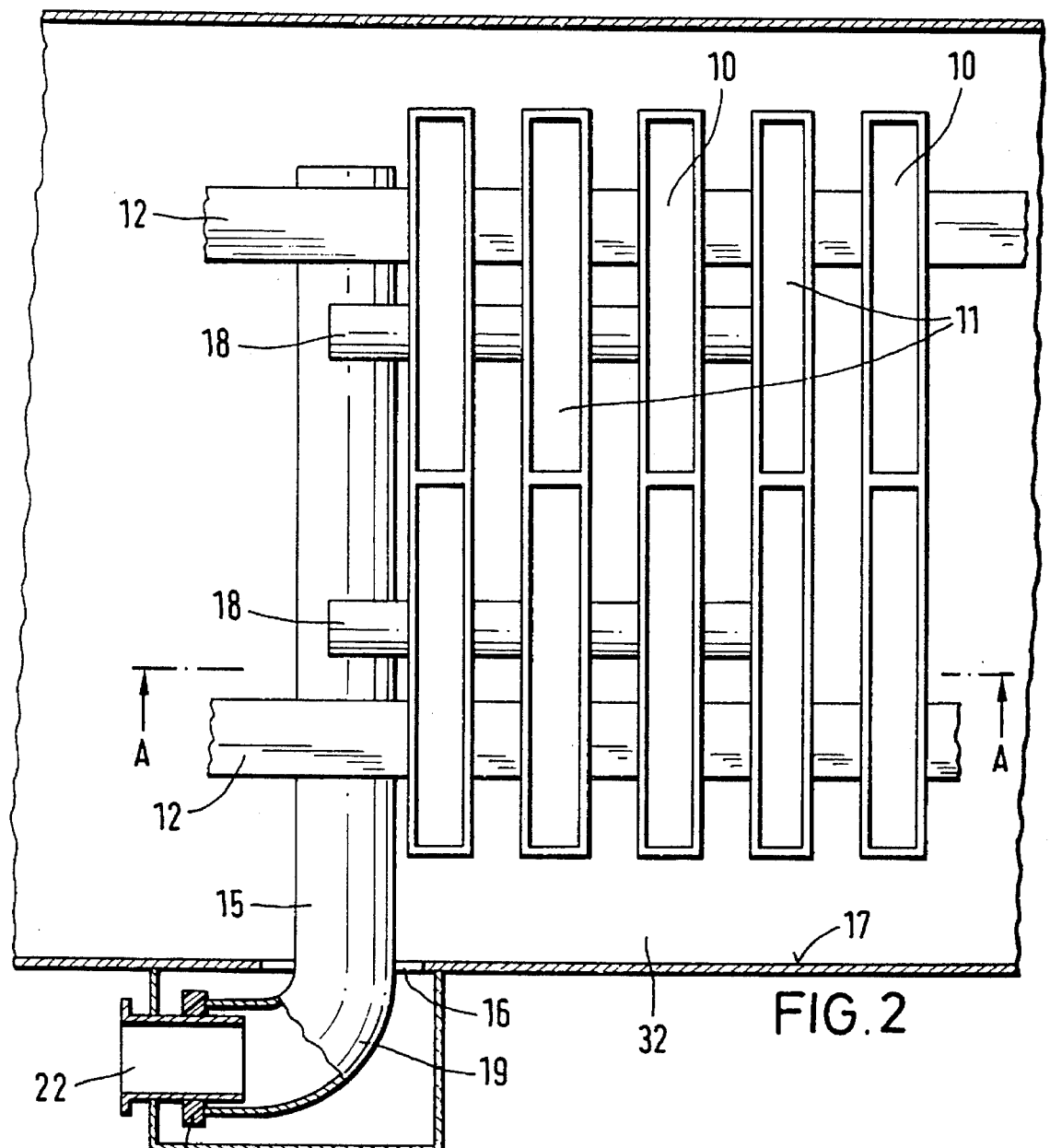
FIG. 2 is a plan view, partially in section, of the thrust grating cooler of the invention in the direction of the arrow B of FIG. 1.

As shown in FIGS. 1 and 2, stationary grating plate carriers 10 alternate in a thrust grating cooler 9 of the present invention with reciprocally movable grating plate carriers 11. The movable grating plate carriers are secured in common on one or more longitudinally movable C-shaped push frames 12. The grating plate carriers 10 and 11 are fashioned as hollow beams and are traversed by cooling air supplied to their interior. A plurality of stationary grating plates 13 are secured on the fixed grating plate carriers 10. A plurality of reciprocally movable grating plates 14 are secured on the movable grating plate carriers 11, as shown in FIG. 1. The grating plate rows 13 and 14 are omitted in the plan view of FIG. 2 to provide greater visibility of the carriers 10, 11. As a result of the common, oscillating motion of all movable grating plate rows 14, the material to be cooled (not shown) is conveyed in batches on the thrust grating and is thereby cooled.

Figure 3:
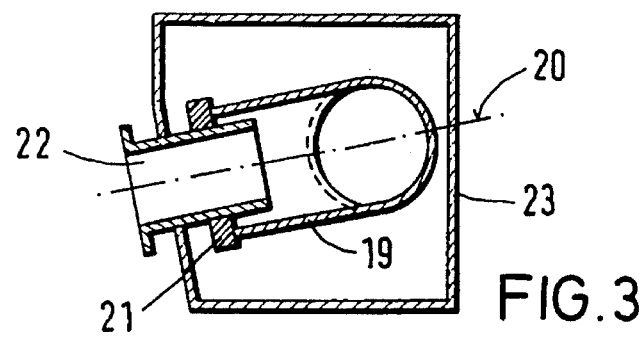
FIG. 3 is a partial side elevational view in the direction of the arrow C of FIG. 2.

A cooling air channel 15 is mounted below the C-push frame 12 so as to move together therewith. The cooling air channel 15 extends transversely relative to a longitudinal axis X of the cooler and is conducted through the sidewall 17 of the cooler (shown in section) by an opening 16 that, for example, can have the shape of an oblong hole. In the exemplary embodiment, two rigid connecting channels 18 branch off from the cooling air channel 15 to the movable grating plate carriers 11. The connecting channels supply the movable grating plate carriers 11, as well as the movable grating plates 14 secured thereon, with cooling air. An end of the cooling air channel 15 which is conducted out through the sidewall 17 of the cooler ends with a 90° elbow 19 whose axis 20 (see FIG. 3) lies parallel to the direction of the reciprocal motion of the C-push frame 12. The elbow 19 is connected via a ring seal 21 to a stationary cooling air delivery nozzle 22. As a result of this connection, the transition from the reciprocally movable elbow 19 to the stationary cooling air delivery nozzle 22 is reliably and dependably sealed. The 90° elbow 19 at the end of the cooling air channel 15, as well as the stationary cooling air delivery nozzle 22, are enclosed in a box 23 covering the opening 16 of the sidewall 17 of the cooler. The pressure of an air chamber 32 of the cooler housing thus prevails in this box 23. The box 23 and elbow to nozzle connection can also be arranged inside the cooler housing avoiding the need for the oversized hole 16.

A plurality of cooling air channels 15 can also be arranged under a thrust grating, a plurality of rigid connecting channels 18 respectively branching off from each of these cooling air channels to the movable grating plate carriers 11 of the thrust grating.

Figure 4:
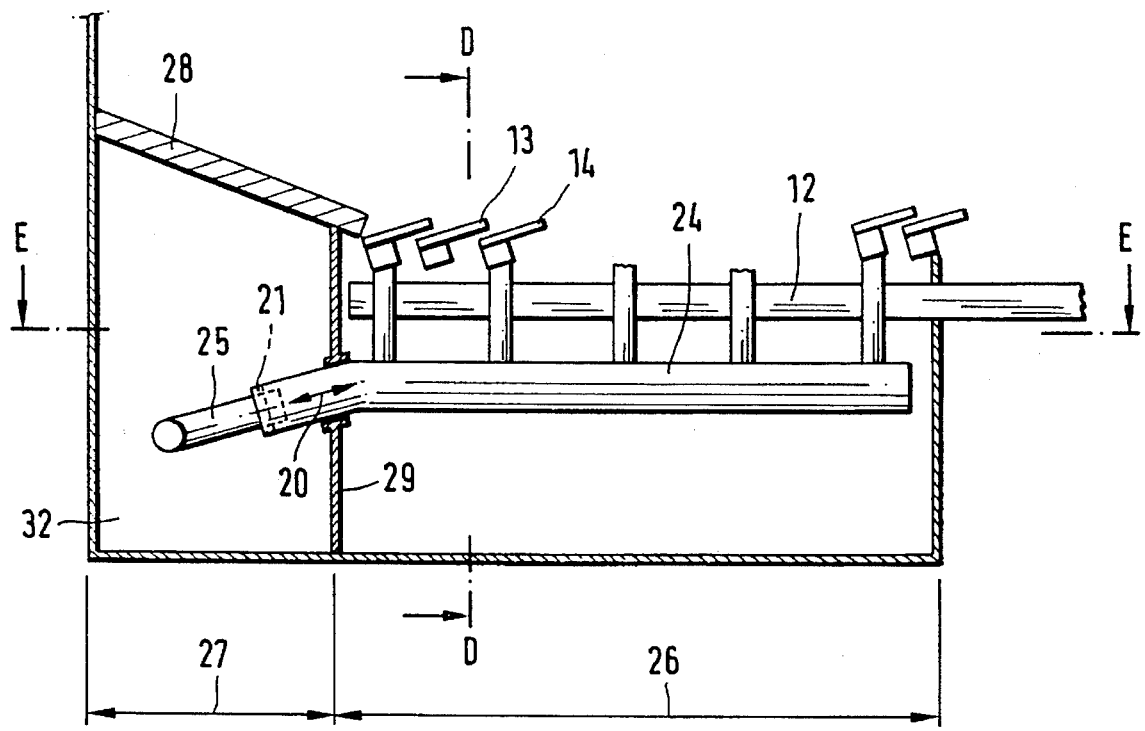
FIG. 4 is a vertical longitudinal sectional view through a second embodiment of the thrust grating cooler of the invention.
Figure 5:
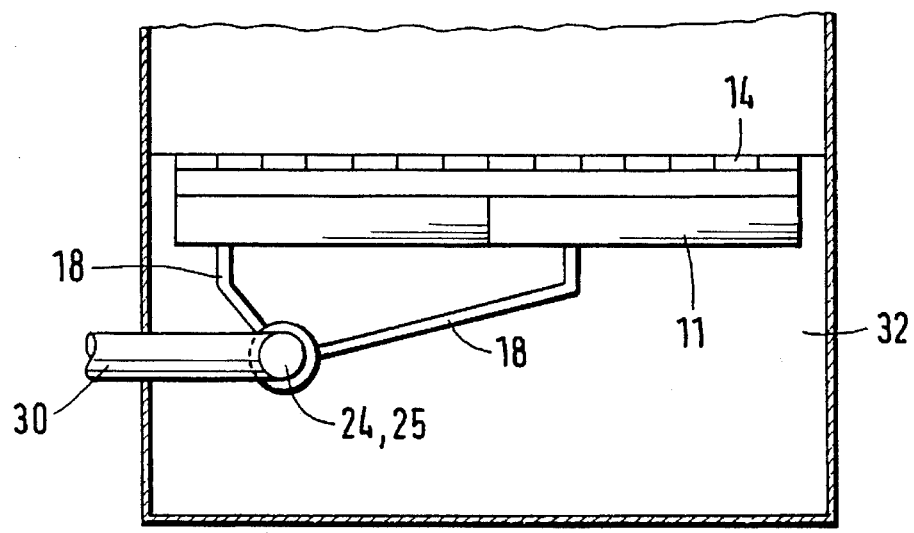
FIG. 5 is a cross-sectional view of the thrust grating cooler generally along the line D—D of FIG. 4.
Figure 6:
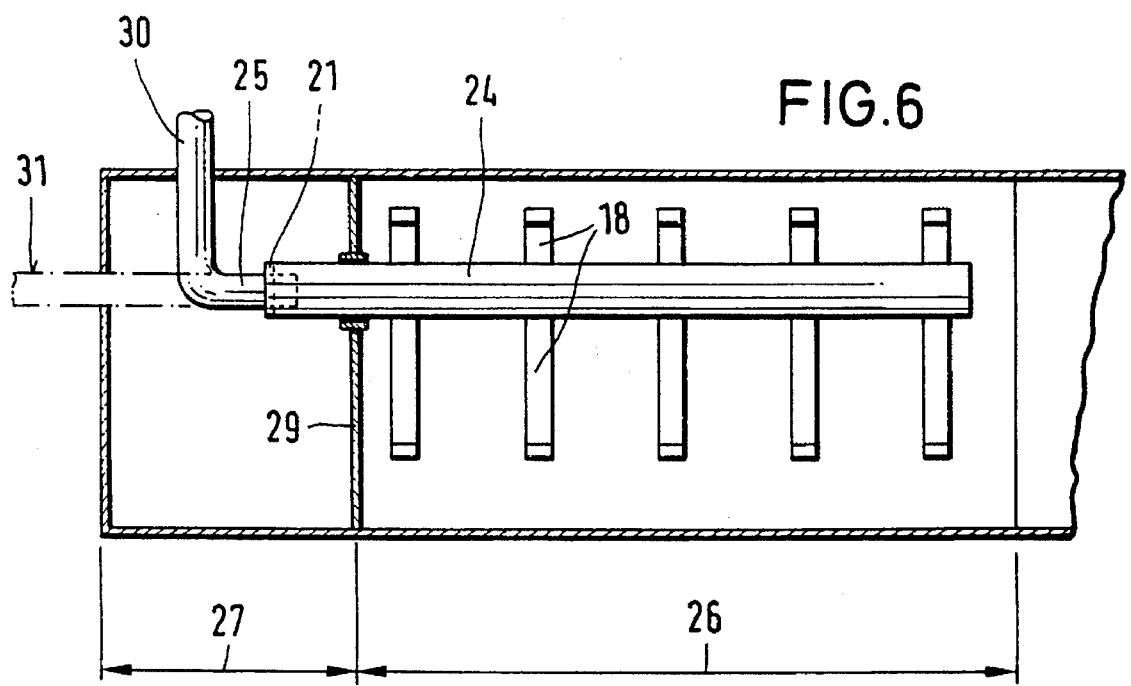
FIG. 6 is a cross-sectional view of the thrust grating cooler generally along the line E—E of FIG. 4.

In installations utilizing larger grating surfaces, wherein a larger number of movable rows 14 of grating plates must be aerated for each C-push frame 12, an air delivery means of the type illustrated in FIG. 2 may no longer be adequate. In such instances, as shown in FIGS. 4 through 6, the air delivery can be undertaken through a cooling air channel 24 oriented parallel to the longitudinal direction of the grating cooler. This cooling air channel 24 is likewise secured below the C-push frame 12, such as to an underside thereof, and moves together with it. The transition from the reciprocally movable cooling air channel 24 to the stationary cooling air delivery nozzle 25 is again sealed with a ring seal 21 and the axis 20 of the air entry end of the co-moved cooling air channel 24 again lies parallel to the direction of the reciprocal motion of the C-push frame 12. The transition from the air entry end of the cooling air channel 24 to the stationary cooling air delivery nozzle 25 is thereby expediently not arranged in a dust-charged region 26 under the movable thrust grating with the stationary rows 13 of grating plates and the movable rows 14 of grating plates, but is arranged in a neighboring region 27 that lies under a separately aerated, stationary grating 28, whereby the regions 26, 27 are separated from one another by a wall 29.

The cooling air delivery to the cooling air channel 24 ensues through stationary admission conduits 30 or 31 that are connected outside the cooler region 27. The rigid connecting channels 18 leading to the movable grating plate carriers 11 of the thrust grating are connected to the cooling air channel 24.

Figure 7:
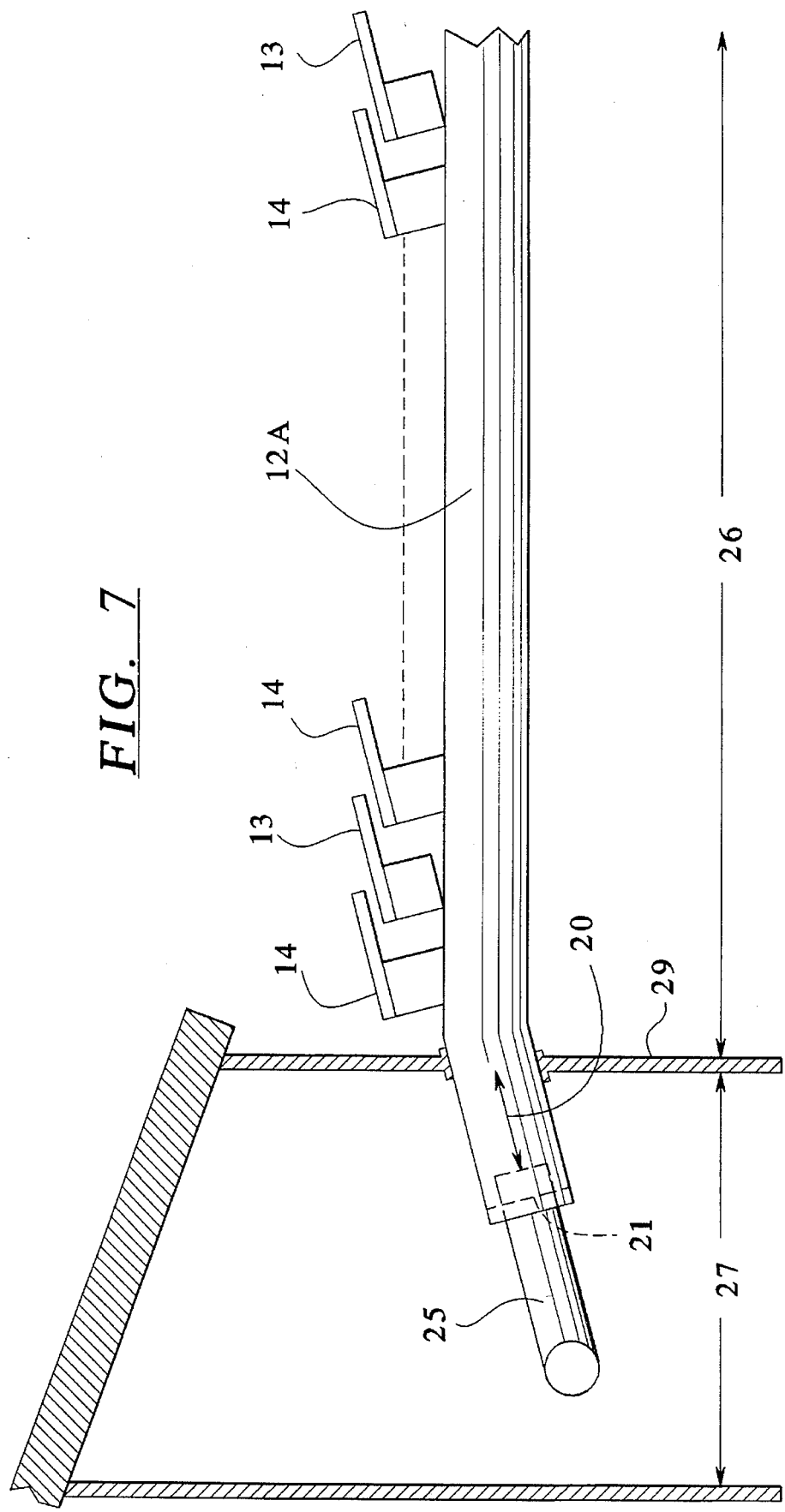
FIG. 7 is a vertical longitudinal sectional view through a third embodiment of the thrust grating cooler of the present invention.

In yet another embodiment of the invention, illustrated schematically in FIG. 7, at least one part of the C-push frame 12A can itself be fashioned as a hollow member and as a cooling air channel that has its cooling air side connected to the movable rows 14 of grating plates. In this case, separate cooling air channels 15 or, respectively, 24 connected to the C-push frame 12 and moved together with it, as shown in FIGS. 1 through 6, can be eliminated.

As is apparent from the foregoing specification, the invention is susceptible of being embodied with various alterations and modifications which may differ particularly from those that have been described in the preceding specification and description. It should be understood that I wish to embody within the scope of the patent warranted hereon all such As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. A thrust grating cooler for cooling hot material comprising:
   a plurality of stationary grating plate carriers formed of hollow beams for receiving cooling air;
   a plurality of reciprocally movable grating plate carriers formed of hollow beams for receiving cooling air;
   a longitudinally reciprocally movable push frame secured to and carrying said movable grating plate carriers;
   at least one cooling air channel arranged so as to move together with said push frame;
   rigid connecting means for providing communication between said cooling air channel and said movable grating plate carriers; and
   a seal for engagement between an air entry end of said movable cooling air channel and a stationary cooling air delivery nozzle.

2. A thrust grating cooler according to claim 1, wherein an axis of said air entry end of said cooling air channel lies parallel to a direction of said reciprocal motion of said push frame.

3. A thrust grating cooler according to claim 1, wherein a connecting point between said cooling air channel and said stationary cooling air delivery nozzle, together with said seal, is arranged under a grating in a cooler housing containing said stationary and movable grating plate carriers.

4. A thrust grating cooler according to claim 1, wherein a connecting point between said cooling air channel and said stationary cooling air delivery nozzle together with said seal is arranged under a grating outside a cooler housing containing said stationary and movable grating plate carriers, but inside a box that is connected to an air chamber of said cooler housing by means of an opening in at least one sidewall of said cooler housing.

5. A thrust grating cooler according to claim 1, wherein said cooling air channel is arranged transversely to a longitudinal axis of said cooler.

6. A thrust grating cooler according to claim 1, wherein said cooling air channel is arranged parallel to a longitudinal axis of said cooler.

7. A thrust grating cooler according to claim 1, wherein a plurality of cooling air channels are arranged under a thrust grating, a plurality of rigid connecting channels to said movable grating plate carriers of the thrust grating branching off from each of said cooling air channels.

8. A thrust grating cooler according to claim 1, wherein at least a part of said push frame is fashioned as a hollow member and as said cooling air channel communicates with said movable grating plate carriers.

9. A thrust grating cooler according to claim 1, wherein said cooling air channel is formed separately from, but is secured to said push frame.

10. A thrust grating cooler according to claim 1, wherein said rigid means comprise connecting channels each communicating at one end with said cooling air channel and at an opposite end to a different one of said movable grating plate carriers.

11. A thrust grating cooler for cooling hot material comprising:
- a plurality of stationary grating plate carriers formed of hollow beams for receiving cooling air;
- a plurality of reciprocally movable grating plate carriers formed of hollow beams for receiving cooling air;
- a longitudinally reciprocally movable push frame secured to and carrying said movable grating plate carriers;
- at least one cooling air channel arranged so as to move together with said push frame;
- rigid connecting means for providing communication between said cooling air channel and said movable grating plate carriers;
- a stationary cooling air channel telescopingly fitted to an air entry end of said movable air channel; and
- a ring seal for engagement between said air entry end of said movable cooling air channel and said stationary cooling air delivery nozzle, an axis of said air entry end of said cooling air channel lying parallel to a direction of said reciprocal motion of said push frame.

12. A thrust grating cooler according to claim 11, wherein a connecting point between said cooling air channel and said stationary cooling air delivery nozzle, together with said seal, is arranged under a grating in a cooler housing containing said stationary and movable grating plate carriers.

13. A thrust grating cooler according to claim 11, wherein a connecting point between said cooling air channel and said stationary cooling air delivery nozzle together with said seal is arranged under a grating outside a cooler housing containing said stationary and movable grating plate carriers, but inside a box that is connected to an air chamber of said cooler housing by means of an opening in at least one sidewall of said cooler housing.

14. A thrust grating cooler according to claim 11, wherein said cooling air channel is arranged transversely to a longitudinal axis of said cooler.

15. A thrust grating cooler according to claim 11, wherein said cooling air channel is arranged parallel to a longitudinal axis of said cooler.

16. A thrust grating cooler according to claim 11, wherein a plurality of cooling air channels are arranged under a thrust grating, a plurality of rigid connecting channels to said movable grating plate carriers of the thrust grating branching off from each of said cooling air channels.

17. A thrust grating cooler according to claim 11, wherein at least a part of said push frame is fashioned as a hollow member and as said cooling air channel communicates with said movable grating plate carriers.

18. A thrust grating cooler according to claim 11, wherein said cooling air channel is formed separately from, but is secured to said push frame.

19. A thrust grating cooler according to claim 11, wherein said rigid means comprise connecting channels each communicating at one end with said cooling air channel and at an opposite end to a different one of said movable grating plate carriers.

20. A method for cooling hot material comprising:
- providing a plurality of grating plates carried on stationary grating plate carriers formed of hollow beams for receiving cooling air;
- providing a plurality of grating plates carried on reciprocally movable grating plate carriers formed of hollow beams for receiving cooling air;
- providing a longitudinally reciprocally movable push frame secured to and carrying said movable grating plate carriers;
- providing at least one cooling air channel arranged so as to move together with said push frame;
- providing rigid connecting means for providing communication between said cooling air channel and said movable grating plate carriers;
- providing a seal for engagement between an air entry end of said movable cooling air channel and a stationary cooling air delivery nozzle;
- reciprocally moving said pusher plate;
- introducing said hot material onto said grating plates; and
- introducing cooling air into said cooling air delivery nozzle.

* * * * *